United States Patent [19]
Bauer et al.

[11] Patent Number: 5,700,319
[45] Date of Patent: Dec. 23, 1997

[54] METHOD FOR EXTENDING PIGMENTS

[75] Inventors: Carl J. Bauer; Benjamin W. Knesek, both of Gonzales, Tex.

[73] Assignee: Southern Clay Products, Inc., Gonzales, Tex.

[21] Appl. No.: 535,374

[22] Filed: Sep. 28, 1995

[51] Int. Cl.$^6$ .................................................. C04B 14/10
[52] U.S. Cl. .................. 106/486; 106/401; 106/DIG. 4
[58] Field of Search ..................... 106/486, 487, 106/400, DIG. 4, 401

[56] References Cited

U.S. PATENT DOCUMENTS

| | | |
|---|---|---|
| 2,754,219 | 7/1956 | Voet et al. . |
| 2,859,234 | 11/1958 | Clem . |
| 3,586,478 | 6/1971 | Neumann . |
| 3,671,478 | 6/1972 | Doyle et al. . |
| 4,049,780 | 9/1977 | Neumann . |
| 4,193,806 | 3/1980 | Finlayson . |
| 4,629,712 | 12/1986 | Pinnavaia . |
| 4,631,091 | 12/1986 | Goodman . |
| 4,963,192 | 10/1990 | Dessauer ................................. 106/487 |
| 5,266,538 | 11/1993 | Knudson . |
| 5,294,254 | 3/1994 | Dessauer et al. ........................ 106/487 |
| 5,391,228 | 2/1995 | Carroll . |
| 5,486,233 | 1/1996 | Mitchell .................................. 106/487 |

FOREIGN PATENT DOCUMENTS

| | | |
|---|---|---|
| 2097376 | 11/1993 | Canada . |
| 1054111 | 1/1967 | United Kingdom . |
| 1155595 | 6/1969 | United Kingdom . |

*Primary Examiner*—Michael Marcheschi
*Attorney, Agent, or Firm*—Klauber & Jackson

[57] ABSTRACT

Unusually high loading levels of smectite minerals are found to provide excellent pigment spacing in aqueous-based coatings, as will enable desired improved hiding, thereby extending the pigment. The level of smectite used in accordance with the invention is sufficiently high that the high gelling efficiency smectites previously used as thixotropes would be inappropriate, and would yield viscosities so high as to render the aqueous coating composition lacking in desired flowability properties. Thus in accordance with the present invention, there is mixed with the aqueous carrier and pigment at least 0.5% by weight of the total composition, of a particulate water swellable smectite which has a gelling efficiency such as to display a 20 rpm Brookfield viscosity of less than 900 cps when subjected to the standard gelling test herein, with the amount of the smectite in the composition not exceeding that which would raise the viscosity of the composition above 110 Krebs Units (KU).

6 Claims, 2 Drawing Sheets

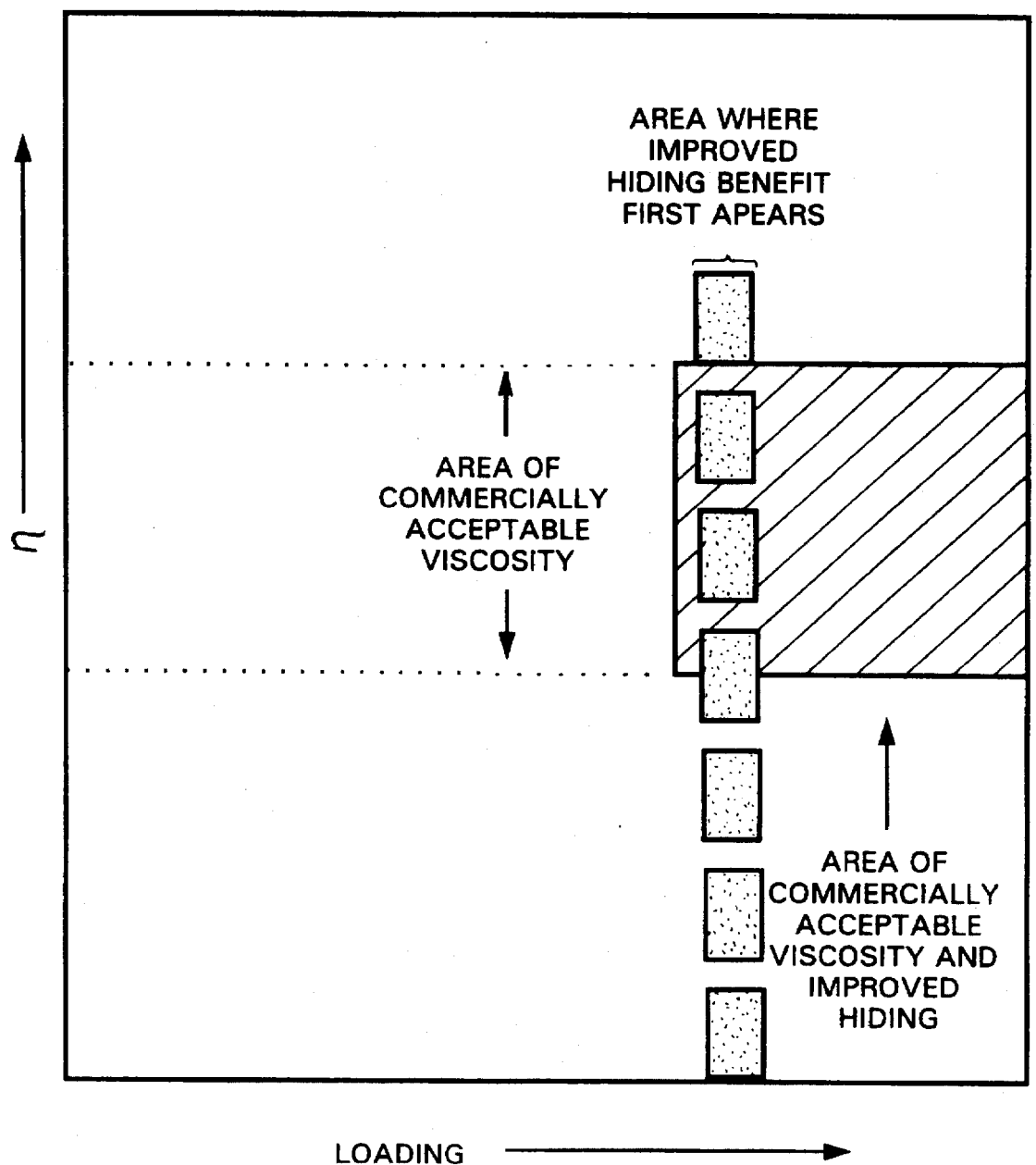

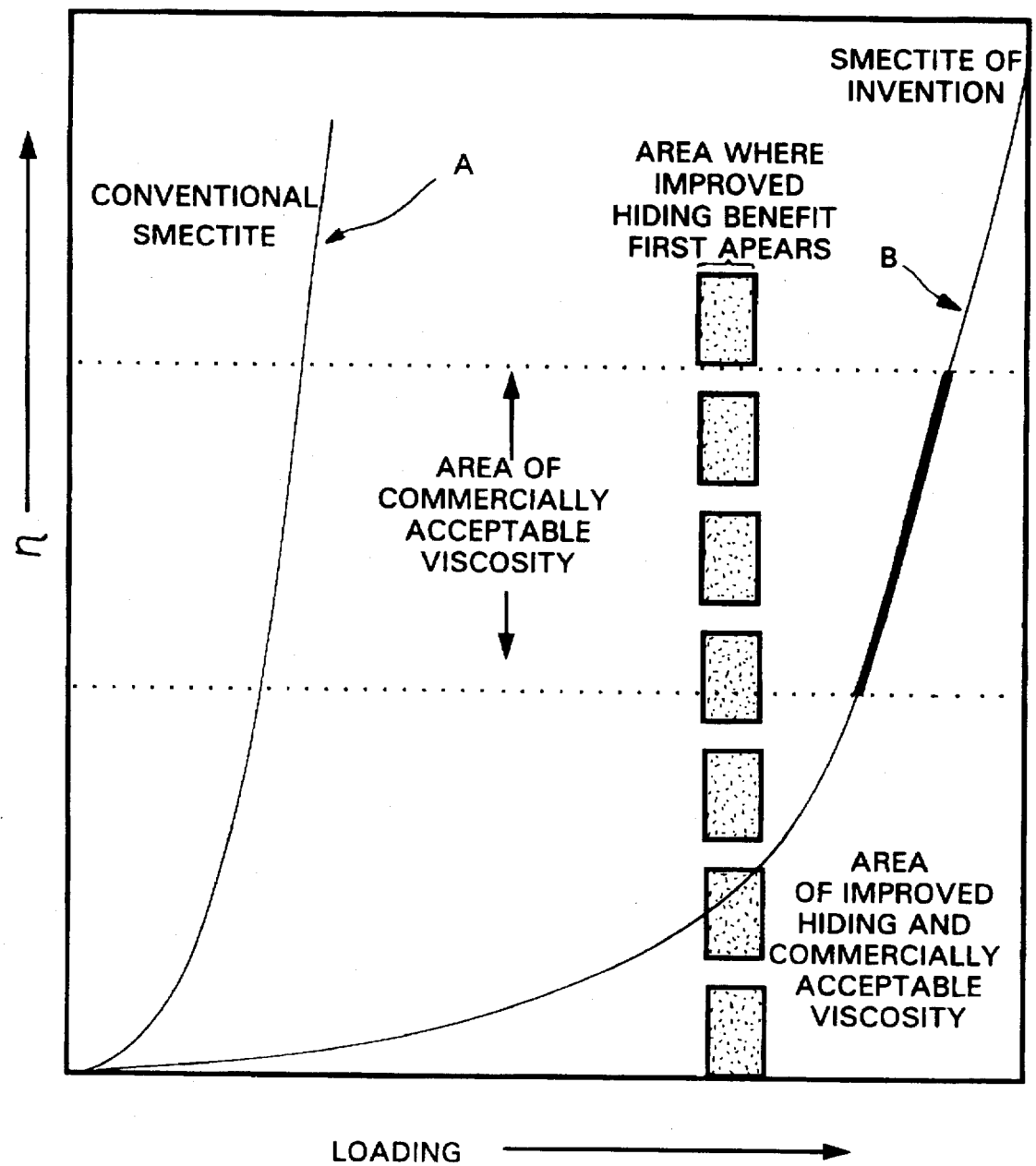

METHOD FOR EXTENDING PIGMENTS

FIELD OF INVENTION

This invention relates generally to aqueous-based coatings and more specifically relates to a method and composition whereby the hiding power of a pigment suspended in such composition is extended.

BACKGROUND OF INVENTION

Aqueous-based coating compositions such as water-based paints depend for their coating or coloring characteristics on relatively expensive and sometimes complex pigments which are suspended in the aqueous vehicle, along with various other components (such as extenders, resins, optionally solvents, and other additives) which contribute to the formation of or augmentation of the resulting coating. Very typically, the pigments in such compositions are high opacifying pigments, designed to effectively hide a substrate—such as titanium dioxide, iron oxides, and carbon black. Among the additives which are commonly present in coating compositions such as water-based paints, are thixotropes which enable a sufficient viscosity in the aqueous composition to enable its proper application to a surface to be coated. One such common thixotrope is hydroxyethylcellulose (HEC). Other known thixotropes include carboxymethyl cellulose, guar gum, acid containing polyacrylates, etc. It has long been known, further, that water swellable smectite clays can serve as excellent thixotropes for such applications. Because such clays have indeed been considered to be primarily useful as thixotropes, the smectites used were those possessing high gelling efficiencies, and typically have been utilized at low concentrations. Typical prior art such smectites, for example, when subjected to the standard water gel test described herein, display a 20 rpm viscosity of well over 1000 cps. In this standard gel test a dispersion of 5% by weight of the clay in water at room temperature (25° C.) is prepared. The 20 rpm viscosity of the resultant mixture is determined with a Brookfield viscosimeter.

SUMMARY OF INVENTION

The hiding power of a coating such as a paint film is determined, among other things by two factors, i.e., the amount of prime pigment loading, and the pigment spacing of the prime pigment in the dry film. Pursuant to the present invention, it has unexpectedly been found that unusually high loading levels of smectite minerals provide excellent pigment spacing as will enable desired improved hiding, thereby extending the pigment. The level of smectite used in accordance with the invention is sufficiently high that the high gelling efficiency smectites previously used as thixotropes would be inappropriate, and would yield viscosities so high as to render the aqueous coating composition lacking in desired flowability properties. Thus in accordance with the present invention, there is mixed with the aqueous carrier and pigment at least 0.5% by weight of the total composition, of a particulate water swellable smectite which has a gelling efficiency such as to display a 20 rpm Brookfield viscosity of less than 900 cps when subjected to the standard gelling test herein, with the amount of the smectite in the composition not exceeding that which would raise the viscosity of the composition above 110 Krebs Units (KU).

BRIEF DESCRIPTION OF DRAWING

In the drawings appended hereto:

FIG. 1 is a graph illustrating the effects of smectite loading upon viscosity and hiding in a typical coating composition; and FIG. 2 illustrates the related characteristics of a typical prior art smectite thixotrope, and the effects yielded by practice of the present invention.

DESCRIPTION OF PREFERRED EMBODIMENTS

The term "hiding power" is used in the present specification, and refers in general to the ability of a dried film formed on a surface by a coating composition to obscure the underlying surface. The term is well recognized in the art. In the present specification, hiding power is measured by the procedure set forth in the Example.

The phenomena addressed by the present invention may be best understood by reference to FIG. 1, which illustrates in a unitless diagram the juxtaposition of the terms "commercially acceptable viscosity" and "improved hiding benefit", as well as the intersecting of these two criteria. Viscosity in a typical aqueous composition is shown on the ordinate as a function of loading of a swellable smectite thixotrope, as shown on the abscissa. As would be expected by those skilled in the art, viscosity of the composition will increase with loading of the clay, and the area of commercially acceptable viscosity is illustrated in the rectangular space thus marked. The vertical dashed bar toward the right of the Figure shows where improved hiding benefits are yielded for a representative pigment by the addition of the smectite thixotrope. This result obtains because the presence of sufficient quantities of the layered plates of the smectites form a structure tending to optimize pigment spacing in the dried coating. Importantly, this is seen to occur at a certain threshold level of loading. In general, therefore, it will be apparent that there is an area defined by the shaded portion of the diagram wherein both commercially acceptable viscosity and improved hiding are enabled, this being the area of interest pursuant to the present invention.

In FIG. 2 the basic concept of the invention is illustrated with reference to a similar diagram as in FIG. 1. Curve A at the left side of the Figure shows typical results in adding a prior art water swellable smectite thixotrope to an aqueous composition such as one of an aqueous paint composition. As expected, commercially acceptable viscosity occurs, but the gelling efficiency of the prior art smectites used as thixotropes is so high that the improved hiding benefits cannot be obtained.

Pursuant to the invention and as shown in FIG. 2, a water swellable smectite (Curve B) is used which has a relatively low gelling efficiency, preferably one yielding a 20 rpm viscosity of less than 900 cps, based on the standard gel test.

By use of such a composition, it is seen that both improved hiding power and commercially acceptable viscosity is enabled.

The smectite-type clays which are utilized in the present invention include the naturally occurring Wyoming and Texas varieties of swelling bentonite and similar clays, and hectorite which is a swelling magnesium-lithium silicate clay. Naturally occurring calcium bentonites can be used in the invention, which can be converted to their sodium forms if the gelling efficiency is not increased beyond the limits specified. Smectite clays prepared synthetically can also be utilized such as the synthetic clays described in British Patent Specification Nos. 1,054,111 and 1,155,595 and in U.S. Pat. Nos. 3,586,478; 3,671,478; and 4,049,780. However, in all instances the clays so utilized are required pursuant to the invention to have a gelling efficiency in the previously indicated range, i.e. so that contrary to prior art practice they are not particularly effective gellants.

The invention is further illustrated by the following Example which is to be considered as illustrative and not delimiting of the invention otherwise described.

EXAMPLE 1

A prior art latex paint formulation had the following composition:

100 GALLON FORMULA

| Raw Material | Weight in lbs |
| --- | --- |
| Water | 250.00 |
| NATROSOL 250 MHBR[1] | 4.00 |
| Mix and Add: | |
| TROYSAN 142[2] | 1.00 |
| TAMOL 731[3] | 6.00 |
| Potassium Tripolyphophsate | 1.00 |
| TRITON CF-10[4] | 2.00 |
| AMP-95 | 1.00 |
| Propylene Glycol | 20.00 |
| BUBBLE BREAKER 748[5] | 2.00 |
| Mix and Add: | |
| TiO$_2$ CR-800[6] | 150.00 |
| ECCA TEX 90[7] | 75.00 |
| SNOWFLAKE WHITE[8] | 357.00 |
| Disperse to 5+ Hegman | |
| Disperse 10 min., Stop | |
| UCAR 376 Latex[1] | 195.00 |
| TEXANOL Solvent | 8.80 |
| BUBBLE BREAKER 748 | 2.00 |
| Water | 159.34 |
| Mix Well | |
| TOTAL | 1234.14 |

[1]HEC product of Aqualon Div. of Hercules Corp.
[2]Bacteriocide product of Troy Chemical
[3]Wetting agent product of Rohm & Haas
[4]Surfactant product of Union Carbide
[5]Defoamer product of Witco
[6]Pigment product of DuPont
[7]Kaolin pigment product of ECC International Inc.
[8]CaCO$_3$ product of ECC International Inc.

A smectite mineral comprising a soft White Texas bentonite clay was used to replace the hydroxyethylcellulose in the above composition as the thixotrope used in the formula. The said smectite when subjected to the standard gel test showed a 20 rpm viscosity of 260 cps. Specifically, the 4 pounds of NATROSOL 250 MHBR was replaced with 12 pounds of the aforementioned smectite mineral. This constituted 0.97% by weight of the total composition. This was found to yield in each instance a Stormer viscosity of 97 Krebs Units, which is commercially acceptable. A prior art sample of the paint formulation as indicated, and the sample of the invention were drawn down with a 3 mm bird bar on a Leneta PENTOPAC drawdown card. The drawdowns were allowed to dry overnight. The hiding power of the paint film was measured on a Hunter color/difference meter D25-2. The drawdowns were measured for Y value and for L value over the sealed black area of the PENTOPAC chart. The paint containing the 12 pounds of smectite mineral was found to yield an L value of 84.5 and a Y value of 69.7, while the prior art paint sample had an L value of 82.5 and a Y value of 66.6.

The loading level of the smectite mineral utilized pursuant to the invention should be in the range of 0.5. to 5% by weight of the total aqueous composition, preferably in the range of 0.5 to 1.5% and more preferably in the range of 0.7–1.5%.

EXAMPLE 2

Three smectite samples, each being a montmorillonite clay, were subjected to the standard gel test, with the following result:

| Sample | 20 rpm Viscosity |
| --- | --- |
| 1 | 1300 cps |
| 2 | 4250 cps |
| 3 | 260 cps |

These samples were then used as in Example 1, to replace the hydroxyethylcellulose (HEC) of the prior art latex paint described. Results were as follows:

| Clay Sample | System Description | Results |
| --- | --- | --- |
| Control | No Clay, 4# HEC | 97 KU, L = 82.5 |
| 1 | 5.0# clay(0.37%), no HEC | 95 KU, L = 82.7 |
| 1 | 12.0# clay(0.97%), no HEC | 135 KU, poor film |
| 2 | 4.0# clay(0.3%), no HEC | 100 KU, L = 82.5 |
| 2 | 12.0# clay(0.97%), no HEC | 140 + KU, poor film |
| 3 | 12.0# clay(0.97%), no HEC | 97 KU, L = 84.5 |

The above results indicate that only Sample 3 yielded both sufficiently low viscosity, and improved hiding as indicated by the higher L value as compared to the control sample. When samples 1 and 2 are used at high enough loading to improve L, the viscosity is seen to be so high that a satisfactory film cannot be formed.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A method for extending the ability of a pigment which is suspended in an aqueous carrier of a coating composition, to obscure an underlying surface upon which said composition has dried to a film, comprising:

admixing with said composition a particulate water swellable smectite in an amount of between 0.5 to 1.5% by weight based on the weight of the total composition, wherein said smectite; has a gelling efficiency such that a dispersion of 5% by weight of the smectite in water at 25° C. displays a 20 rpm Brookfield viscosity of less than 900 cps.

2. An aqueous pigment-containing composition having high hiding power to obscure a surface when the composition is applied on said surface and dried to a film; said composition comprising an aqueous carrier; a pigment suspended in said carrier; and particulate water swellable smectite in an amount of between 0.5 to 1.5% by weight based on the weight of the total composition, wherein said smectite; has a gelling efficiency such that a dispersion of 5% by weight of the smectite in water at 25° C. displays a 20 rpm Brookfield viscosity of less than 900 cps.

3. A method in accordance with claim 1, wherein said smectite is a bentonite.

4. A method in accordance with claim 3, wherein said bentonite is added to said composition in an amount of between 0.7 to 1.5% by weight.

5. A composition in accordance with claim 2, wherein said smectite is a bentonite.

6. A composition in accordance with claim 5, wherein said bentonite is present in said composition in an amount of between 0.7 to 1.5% by weight.

* * * * *